United States Patent [19]

Manska

[11] Patent Number: 5,156,186

[45] Date of Patent: * Oct. 20, 1992

[54] STOPCOCK VALVE

[76] Inventor: Wayne E. Manska, 1921 Kellogg Dr., Anaheim, Calif. 92807

[*] Notice: The portion of the term of this patent subsequent to Sep. 10, 2008 has been disclaimed.

[21] Appl. No.: 705,287

[22] Filed: May 24, 1991

Related U.S. Application Data

[60] Division of Ser. No. 595,791, Oct. 9, 1990, Pat. No. 5,046,528, which is a continuation of Ser. No. 429,630, Oct. 31, 1989, abandoned.

[51] Int. Cl.$^5$ .............................................. F16K 37/00
[52] U.S. Cl. ................................... 137/556; 137/385; 257/304; 257/309
[58] Field of Search .................... 137/385, 551, 556; 251/304, 309, 312; 604/32, 246

[56] References Cited

U.S. PATENT DOCUMENTS

| | | | |
|---|---|---|---|
| 2,324,633 | 7/1943 | McCarthy et al. | 137/385 X |
| 2,991,804 | 7/1961 | Merkle | 137/625.23 |
| 3,298,661 | 1/1967 | Stam | 251/104 |
| 3,525,363 | 8/1970 | Gore et al. | 251/309 X |
| 3,678,960 | 7/1972 | Leibinsohn | 251/309 X |
| 3,780,736 | 12/1973 | Chen | 137/625.47 X |
| 3,945,603 | 3/1976 | Fraser | 251/309 X |
| 4,015,816 | 4/1977 | Semon | 251/309 X |
| 4,314,586 | 2/1982 | Folkman | 251/309 X |
| 4,667,927 | 5/1987 | Oscarsson | 251/309 |
| 4,807,666 | 2/1989 | Morse | 251/309 X |

FOREIGN PATENT DOCUMENTS

| | | | |
|---|---|---|---|
| 513761 | 2/1955 | Italy | 251/304 |
| 2166222 | 4/1986 | United Kingdom . | |

OTHER PUBLICATIONS

Halkey Roberts brochure, date unknown.
Qosina Corp. brochure, date unknown.

*Primary Examiner*—John Rivell
*Attorney, Agent, or Firm*—Knobbe, Martens, Olson & Bear

[57] ABSTRACT

A one-hand operable valve comprises a housing and an actuator which is mounted in the housing. The actuator includes a pair of driving members, and the housing includes a pair of support members. These members provide two pairs of pressure application surfaces oriented to permit the operational state of the valve to be changed using two fingers of one hand. The valve preferably includes a locking mechanism which selectively locks the actuator and housing to prevent relative rotation therebetween. In the preferred embodiment, a system of indicia is employed to designate the operational state of the valve.

46 Claims, 9 Drawing Sheets

STOPCOCK VALVE

This application is a division, of application Ser. No. 595,791, filed Oct. 5, 1990 now U.S. Pat. No. 5,046,528 which is a continuation of Ser. No. 429,630 filed Oct. 31, 1989 now abandoned.

BACKGROUND OF THE INVENTION

The present invention relates generally to valves, and particularly to one-hand operable stopcock valves for medical use.

Stopcock valves are used for a variety of medical applications. For example, stopcocks are commonly used on IV lines to start and stop fluid flow through the lines. Stopcocks may also be used to selectively connect various lines for drug dispensing, blood sampling and other medical procedures.

Present commercially available stopcocks typically employ a rotatable member having a fluid passage. The rotatable member may be rotated to various positions to orient the passage to selectively connect or disconnect fluid lines in accordance with the medical procedure to be performed. The stopcocks are ordinarily operated by grasping the stopcock housing in one hand and turning the rotatable member with the other hand. This method of operation is inconvenient since both hands must be free. Any instruments used by a nurse or physician during the medical procedure must be temporarily set aside to operate the stopcock. If the nurse or physician attempts to operate the stopcock while holding the instruments, there is a risk of dropping or damaging the instruments during manipulation of the stopcock. Further, if the instruments are sharp (e.g., needles), there is a risk of injury to the nurse, physician or patient.

Accordingly, there is a need in the art for a stopcock which may be conveniently and easily operated with finger pressure using only one hand.

SUMMARY OF THE INVENTION

The present invention comprises a one-hand operable valve having a housing and an actuator. The housing comprises first and second ports, and includes first and second support members. The actuator comprises a rotatable member, mounted in the housing, having first and second driving members for driving the rotatable member about an axis of rotation. The first support member and first driving member provide a first pair of pressure application surfaces, while the second support member and second driving member provide a second pair of pressure application surfaces. The pairs of pressure application surfaces are sized for application of squeezing pressure thereon by two fingers of one hand, such as a thumb and forefinger. The pressure application surfaces are oriented such that the rotatable member rotates from a first position to a second position in response to squeezing force against the first pair of pressure application surfaces so as to place the valve in a first operational state, and rotates from the second position to the first position in response to squeezing force against the second pair of pressure application surfaces so as to place the valve in a second operational state.

The pressure application surfaces are oriented such that the squeezing pressure on each of the pairs of pressure application surfaces provide rotation inducing forces which act in opposition to rotate the rotatable member and its position to be selectively changed without torquing the housing along an axis other than the axis of rotation. In the preferred embodiment, the first driving member rotates within a first region bounded by a first pair of planes which are perpendicular to the axis of rotation, while the first support member lies in a second region bounded by a second pair of planes which are perpendicular to the axis of rotation. The first pair of planes are spaced by a first distance such that the first driving member extends from one of the pair of planes to the other, while the second pair of planes are spaced by a second distance such that the first support member extends from one of the second pair of planes to the other. The first and second regions at least partially overlap in a common region such that at least a portion of both of the first pair of pressure application surfaces lies within the common region.

The valve of the present invention is highly advantageous in that it provides a means and method for changing the operational state of the rotatable member using a single hand without applying torque to the housing about an axis other than the axis of rotation of the rotatable member. A preferred use for the valve is in medical applications, particularly regulation of fluid flow in IV lines and the like. Preferably, the inlet and outlet ports of the valve include luer fittings for connection to such IV lines or other medical devices.

One embodiment of the invention comprises a "one-way" stopcock which has an "on" position and an "off" position. Another embodiment comprises a three-way stopcock in which the rotatable member has a passage configured to selectively fluidly connect any of three pairs of fluid ports upon rotation of the rotatable member to three respective positions. Both of these embodiments preferably include indicia on the housing and actuator which are relatively positioned to indicate the operable state of the valve.

According to another aspect of the invention, the valve comprises a housing, an actuator and a locking mechanism. The housing has plural fluid ports, while the actuator is rotatably mounted in the housing to selectively connect the fluid ports. The locking mechanism has two positions, one of which locks the actuator to the housing to prevent relative rotation therebetween, and the other of which unlocks the actuator and the housing to permit relative rotation therebetween.

DESCRIPTION OF THE PREFERRED EMBODIMENTS

Figure 1:
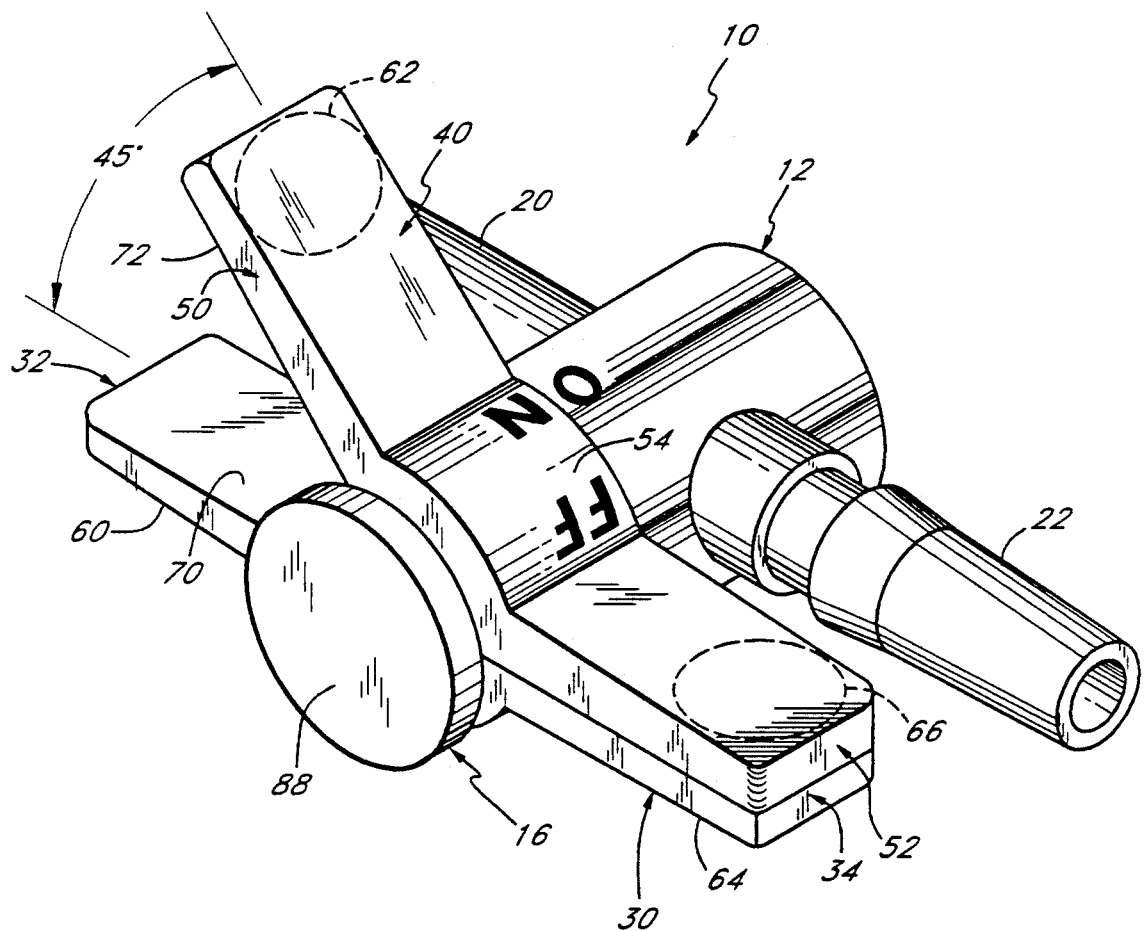
FIG. 1 is a perspective view of a preferred embodiment of the present invention, showing indicia for determining the operable state of the valve.
Figure 2:
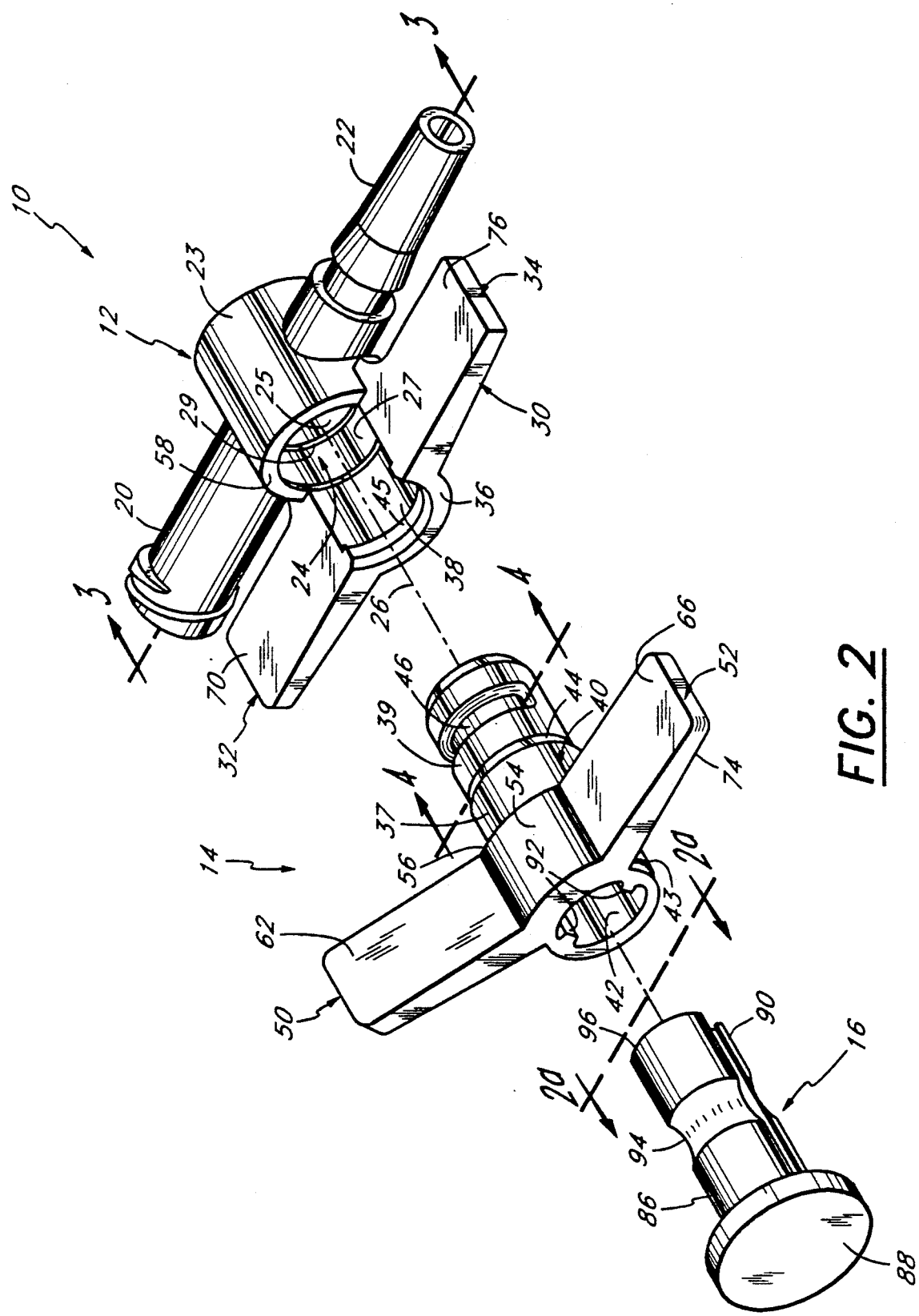
FIG. 2 is an exploded perspective view of the valve of FIG. 1 showing the main body, actuator and locking pin.

As shown in FIGS. 1 and 2, a preferred embodiment of the present invention comprises a one-way stopcock valve 10 for controlling fluid flow in a tube such as an IV line connected to a patient. The stopcock valve 10 has two positions, one which blocks flow through the line and the other which permits flow through the line.

Figure 3:
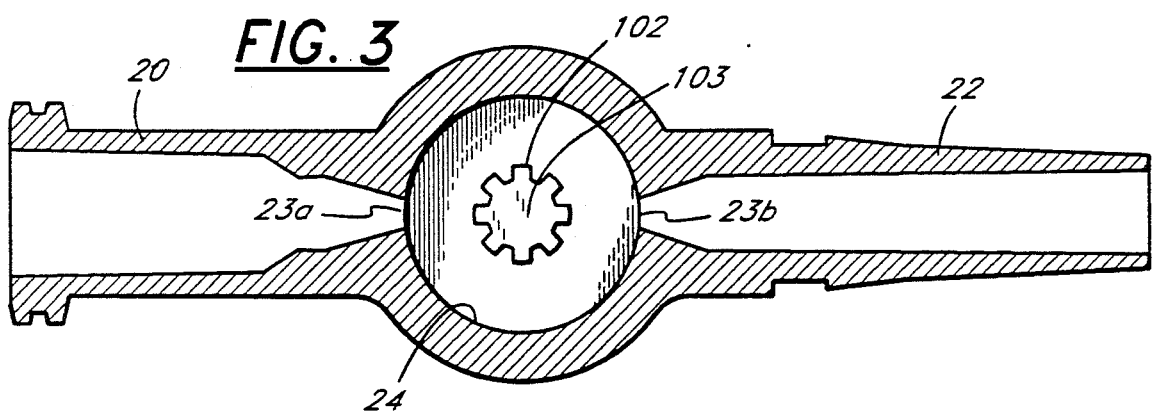
FIG. 3 is a cross-sectional view taken along the lines 3—3 of FIG. 2, showing external splines which mate with the internal splines of the locking pin to selectively lock the valve in a selected operable state.

The stopcock 10 of the preferred embodiment is comprised of a housing 12 and an actuator 14 having a locking member 16. The housing 12 includes two tubular ports 20, 22, one of which serves as a fluid input tube to the valve 10 ant the other of which serves as a fluid output tube from the valve 10. The ports 20, 22 are formed as female and male luer fittings, respectively, for connection to fluid lines or other devices. Other types of fittings may be used alternatively, as will be apparent to those skilled int he art. The housing 12 also comprises a main body 23 which includes a central bore 24 having a longitudinal axis 26. The bore 24 which has a generally circular cross-section, includes a fluid port portion 25 and a sealing portion 27, separated by an annular shoulder 29. As shown in FIG. 3, the fluid passages in the fluid ports 20, 22 are both open to the fluid port portion of the bore 24, at openings 23a, 23b, respectively, so as to provide fluid communication to and from the bore 24.

The housing 12 also includes a wing structure 30 which is rigidly attached to the main body 23. The wing structure 30 comprises a pair of support members 32, 34, which lie substantially in a common plane and extend diametrically from opposite sides of an arcuate body extension member 36. This body extension member 36 has a semi-circular cross-section with an inside diameter substantially the same or slightly larger than that of the bore 24 so as to form a half cylinder which is integrally joined to the main body 23. The body extension member 36 has a longitudinal axis coincident with the longitudinal axis 26, and provides a half bore 38 which is aligned with the bore 24.

Figure 4:
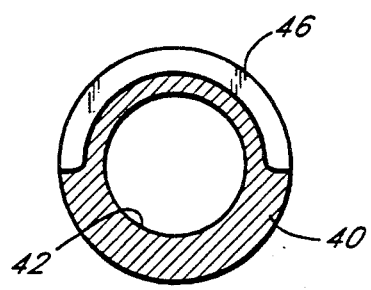
FIG. 4 is a cross-sectional view taken along the lines 4—4 of FIG. 2 , showing an annular groove extending through 180° of circumference of a rotatable member to provide selective fluid communication between ports of the valve.

The actuator 14 comprises a generally cylindrical rotatable member 40 having a longitudinal bore 42 throughout its length. The bore 42 has a longitudinal axis coincident with the axis 26. The rotatable member 40 has an outside diameter which is substantially the same as the inside diameter of the bore 24, to permit the member 40 to be rotatably mounted within the bore 24 of the main body 23 of the housing 12. A protrusion 43, which extends annularly around one side of the rotatable member 40, snaps over a lip 45 on the arcuate body extension member 36 to retain the rotatable member 40 within the bore 24. The rotatable member 40 also includes a sealing surface portion 37 and fluid port portion 39 separated by a small annular shoulder 44. The fluid port portion 39 has an annular groove 46 on the exterior surface thereof which extends halfway around the rotatable member (i.e., through 180° of arc around the periphery of the rotatable member), as shown in FIG. 4. The groove 46 is disposed on the rotatable member 40 such that when the rotatable member is fully inserted into the bore 24, the groove is aligned with the openings 23a, 23b (FIG. 3) to the fluid ports 20, 22. The sealing portion 37 of the rotatable member is disposed to mate with and seal against the sealing portion 27 of the bore 24 to provide a fluid-tight seal between the rotatable member 40 and main body 23, and thereby prevent contaminants from entering the bore 24.

Figure 5:
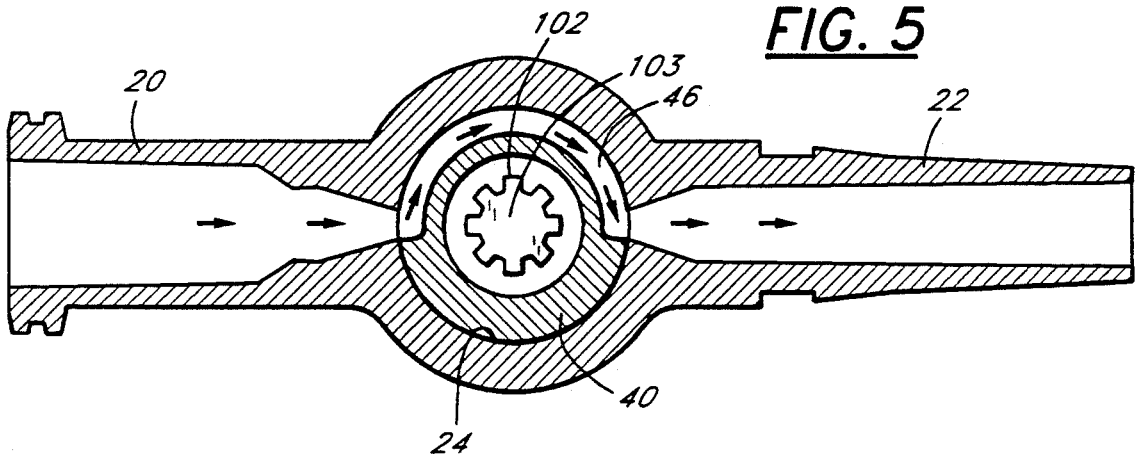
FIG. 5 is a schematic illustration showing the annular groove positioned to fluidly connect two ports of the valve.
Figure 6:
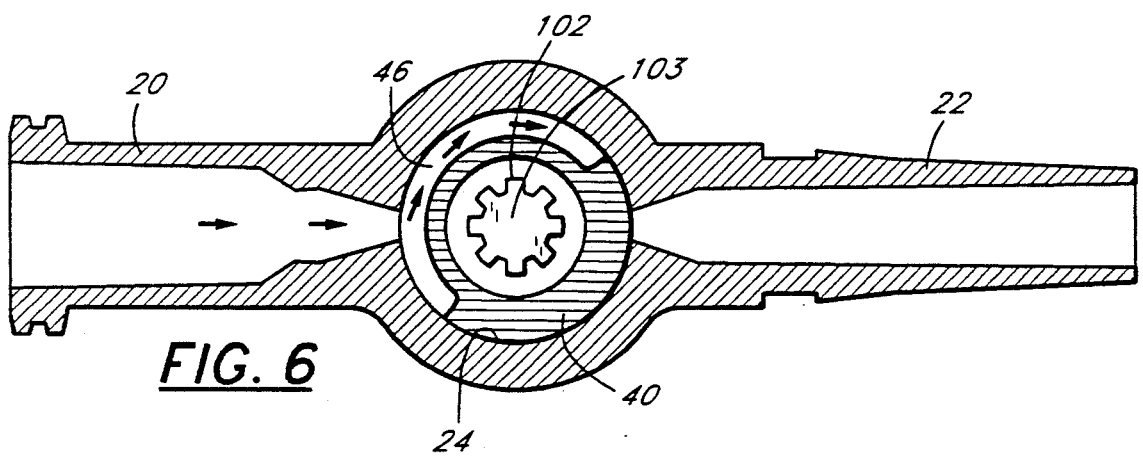
FIG. 6 is a schematic illustration showing the annular groove positioned to prevent fluid communication between two ports of the valve.

By rotating the rotatable member 40, the groove 46 may be positioned to enable fluid communication between the ports 20, 22, as illustrated in FIG. 5, or the rotatable member may be rotated to block fluid communication between the ports 20, 22, as illustrated in FIG. 6. Rotation of the rotatable member 40 is facilitated by a pair of driving members 50, 52, which project radially from the rotatable member 40. The driving members 40, 52 are angularly disposed from each other by about 135° of circumference of the rotatable member 40. The rotatable member 40 includes an abutment portion 54 through this 135° of circumference, and this abutment portion 54 has a surface 56 which abuts a surface 58 on the main body member 23. The members 50, 52 are positioned with respect to the longitudinal axis 26 of the rotatable member 40 such that when the rotatable member 40 is mounted in the bore 24 with the surfaces 56, 58 substantially abutting, the driving members 50, 52 are aligned with the support members 32, 34, respectively. Such alignment of the driving member 50 relative to the support member 32 and the driving member 52 relative to the support member 34 places the member pairs 50, 32 and the member pairs 52, 34 in opposing relationship so that they can be driven towards each other by squeezing the member pairs between two fingers. More specifically, the support member 32 provides a pressure application surface 60 and the driving member 50 provides a pressure application surface 62. The pressure application surfaces 60, 62 encompass the area of the members 32, 50 over which finger pressure is applied (e.g., between a thumb and forefinger) to drive the members 32, 50 toward each other. Such area is disposed away from the rotational axis 26 (i.e., towards the ends of the driving and support members) so as to enhance leverage. Exemplary pressure application surfaces are illustrated in FIG. 1 by dashed circles. By applying force to these two surfaces 60, 62 (e.g., by squeezing them between two fingers of one hand of the user), the rotatable member will be driven from the "on" position shown in FIG. 5 to the "off" position shown in FIG. 6. Similarly, by applying such force to a pressure application surface 64 of the driving support member 34 and a pressure application surface 66 of the driving member 52, the rotatable member will be rotated from the "off" position shown in FIG. 6 to the "on" position shown in FIG. 5. Due to the 135° angular displacement of the driving members 50, 52 relative to the 180° angular displacement of the support members 32, 34, the amount of rotation will be approximately 45°. Further rotation is prevented by stop surfaces on each of the members 32, 50 and 34, 52. More specifically, the support member 32 includes a stop surface 70 which coacts with a stop surface 72 on the driving member 50 to prevent further rotation. Similarly, the driving surface 52 has a stop surface 74 which coacts with a stop surface 76 on the support member 34 to prevent further rotation.

Figure 7:
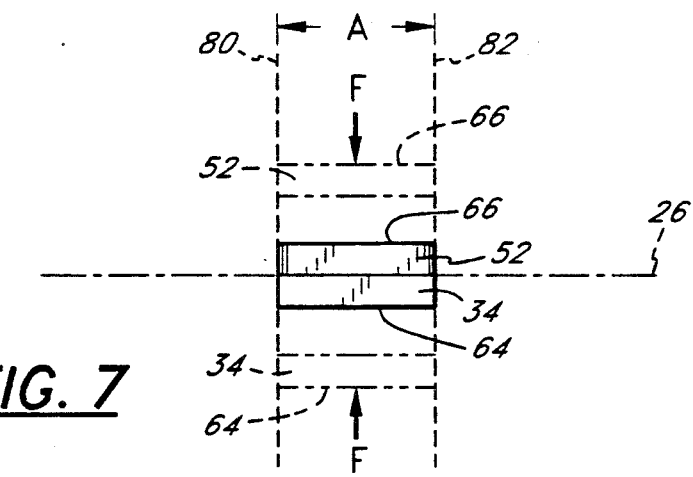
FIG. 7 is a schematic diagram showing the pressure application surfaces in a preferred orientation which prevents unwanted twisting of the valve.

To ensure proper one-hand operation, it is preferable to align the pressure application surfaces to prevent unwanted twisting of the valve during operation. In this regard, FIG. 7 schematically shows exemplary pressure application surfaces 64, 66 at the ends of the members 34, 52. In FIG. 7, the members 34, 52 are viewed in a direction perpendicular to the axis of rotation 26. The members 34, 52 are shown in dotted lines to represent the "off" position corresponding to FIG. 6, and are shown in solid lines to represent the "on" position corresponding to FIG. 5. During operation, squeezing forces, designated by the arrows labeled F, are applied in directly opposing fashion to force the pressure application surfaces 64, 66 towards each other so as to rotate the member 50 about its axis of rotation 26. To prevent torquing of the members 34, 52 about an axis other than the axis 26, it is preferable to ensure that at least a portion of both pressure application surfaces 64, 66 lie within a bounded region defined by planar boundaries 80, 82, which are perpendicular to the axis of rotation 26, as shown in FIG. 7. The bounded region has a thickness between the planes 80, 82 (i.e., dimension A) which is equal to the width of the smaller of the members 34, 52 so that both members 34, 52 lie at least partially within the bounded region. In the preferred embodiment, the members 34, 52 are of equal size and thus, both of the members 34, 52 and their pressure application surfaces 64, 66 lie completely within the dimension A in both of these cases. Although the above arrangement has been described in reference to the surfaces 64, 66, it will be understood that the other pair of pressure application surfaces 60, 62 are similarly arranged.

While the above-described valve 10 is fully functional without the locking member 16, such locking member is advantageously included to lock the rotatable member 40 in either of the positions shown in FIGS. 5 and 6. The locking member 16 comprises a pin 86 and a head 88, as shown in FIG. 2. The pin 86 has a pair of exterior diametrically opposed grooves 90 which extend longitudinally along the length of the pin 86. The grooves 90 are sized to receive a corresponding pair of ribs 92 which extend longitudinally along the bore 42 of the actuator 14. Thus, the grooves 90 and ribs 92 slave the pin 86 to the actuator 14 to prevent them from rotating relative to one another.

Figure 2A:
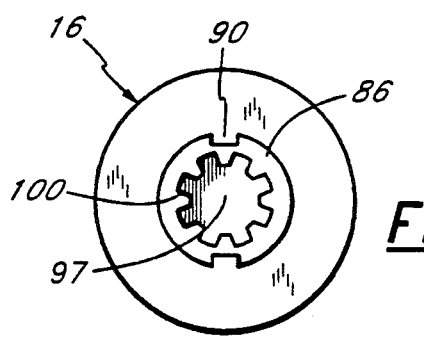
FIG. 2a is an end view of the locking pin of FIG. 2 taken along lines 2a—2a showing internal splines which selectively lock the pin to the main body and also showing grooves which slave the pin to rotate with the actuator.

The pin 86 has a recessed portion 94 which snaps into an annular rib (not shown) within the bore 42 to retain the pin 86 within the actuator 14. The recessed portion 94 is significantly wider than the width of the annular rib so as to permit a degree of longitudinal movement of the pin 86 with respect to the actuator 14. As shown in FIGS. 2 and 2a, the pin 86 has an actuator end 96 (opposite the head 88) with a recess 97 which includes internal splines 100, which mate with external splines 102 on a boss 103 (FIG. 3) at the end of the bore 24 of the main body 23. The pin 86 is sized so that when the pin 86 is fully inserted into the bore 42 of the actuator, the internal splines 100 mate with the external splines 102 to prevent rotational movement of the actuator 14 relative to the housing 12. The relatively wide recess 94, however, permits the pin 86 to be withdrawn (by pulling on the head 88) by an amount which disengages the splines 100 and 102 to thereby permit rotation of the actuator 14 relative to the housing 12. Accordingly, by pushing the pin 86 into the bore 42 by a sufficient amount to engage the splines 102, the rotatable member 40 can be locked in either position shown in FIG. 5 or the position shown in FIG. 6. Operation of the actuator 14 can be restored simply by withdrawing the pin 86 by an amount sufficient to disengage the splines 102. Those skilled in the art will understand that other types of locking mechanisms, such as a blade and groove, could be substituted for the splines.

The above-described valve 10 also includes indicia to designate whether the valve is "on" (i.e., the position shown in FIG. 5) or "off" (i.e., the position shown in FIG. 6). As illustrated in FIG. 1, the letter "N" and the letters "FF" are printed on the surface of the abutment portion 54 between the pressure application surfaces 62, 66 adjacent the interface between this portion 54 and the main body 23. More specifically, the letter "N" is printed adjacent the pressure application surfaces 62 and the letters "FF" are printed adjacent the pressure application surface 66. The letter "O" is printed on the main body 23 adjacent the interface between the main body 23 and the abutment portion 54. The letters are positioned so that when the members 52, 34 are driven together, the letter "O" on the main body 23 aligns with the letter "N" on the abutment portion 54 to spell the word "ON." Similarly, the letters are also positioned so that when the members 50, 32 are driven together, the letters "O" on the main body 23 aligns with the letters "FF" on the abutment portion 54 to spell the word "OFF." This system of indicia provides a positive indication as to the operating status of the valve and removes any confusion or ambiguity regarding its operational state.

Figure 8A:
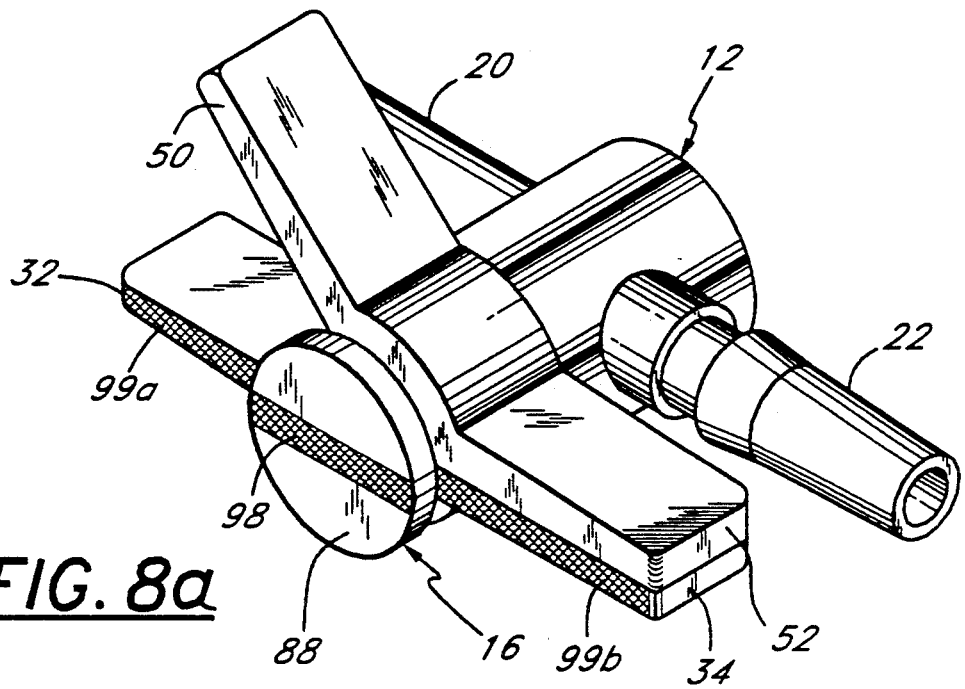
FIG. 8a is a schematic illustration showing an alternative indicia for determining the operable state of the valve and illustrating the position of the indicia when the actuator is oriented for fluid communication between ports of the valve.
Figure 8B:
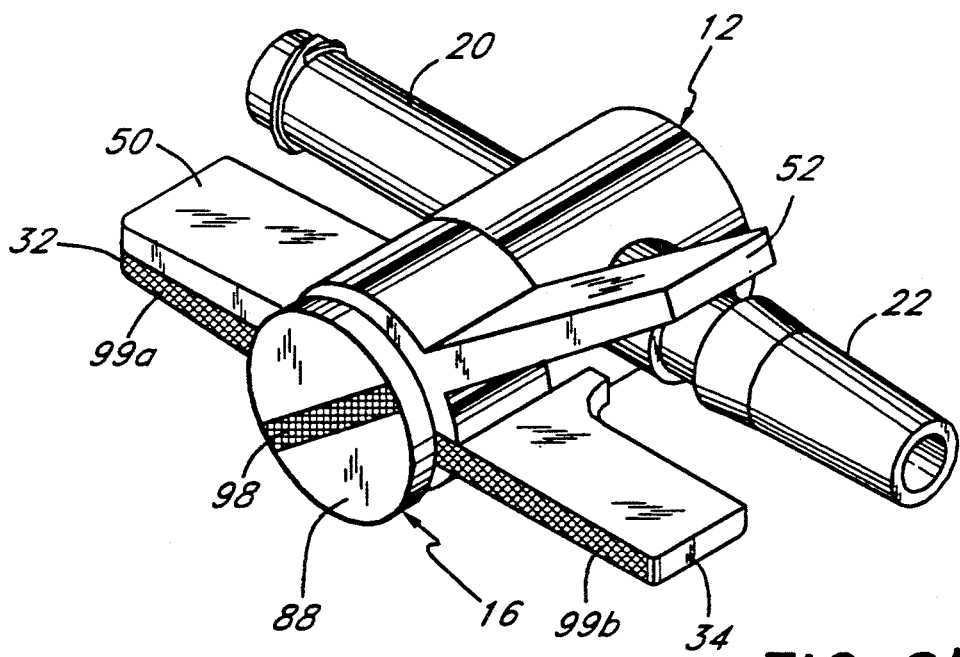
FIG. 8b is a schematic illustration of the fluid path indicia of FIG. 8a, showing the indicia oriented to depict lack of fluid communication between the ports of the valve.

An alternative indicia is disclosed in FIGS. 8a and 8b. As shown therein, a colored strip or line 98 is applied (e.g., by printing) to the surface of the head 88 of the locking member 16. The thickness of the colored strip 98 is approximately equal to the thickness of the support members 32, 34, and the strip 98 bisects the head 88 substantially diametrically. Preferably, edges 99a, 99b of the support members 32, 34, respectively, are similarly colored. The colored strip 98 on the head 88 is oriented such that when the valve is "on" (FIG. 5), the line 98 on the head 88 extends between the edges 99a, 99b so that the three line segments 99a, 98, 99b blend into a single line, as illustrated in FIG. 8a. When the rotatable member 40 is rotated to the "off" position (FIG. 6), the head 88, being slaved to rotate with the actuator 14, will rotate by 45°, thereby breaking continuity between the three line segments 99a, 98, 99b to indicate that the valve is off, as shown in FIG. 8b. Although this system of indicia utilizes the head of the locking pin for the middle line segment 98, it will be understood that a locking pin is not essential and that the indicia may be utilized on a valve without a locking pin merely by applying the segment 98 to the end of the actuator 14. Further, while the segments 99a, 98, 99b are shown as straight lines, other types of arrangement, such as curved lines, may be used so long as they are capable of depicting fluid continuity and discontinuity.

Figure 9:
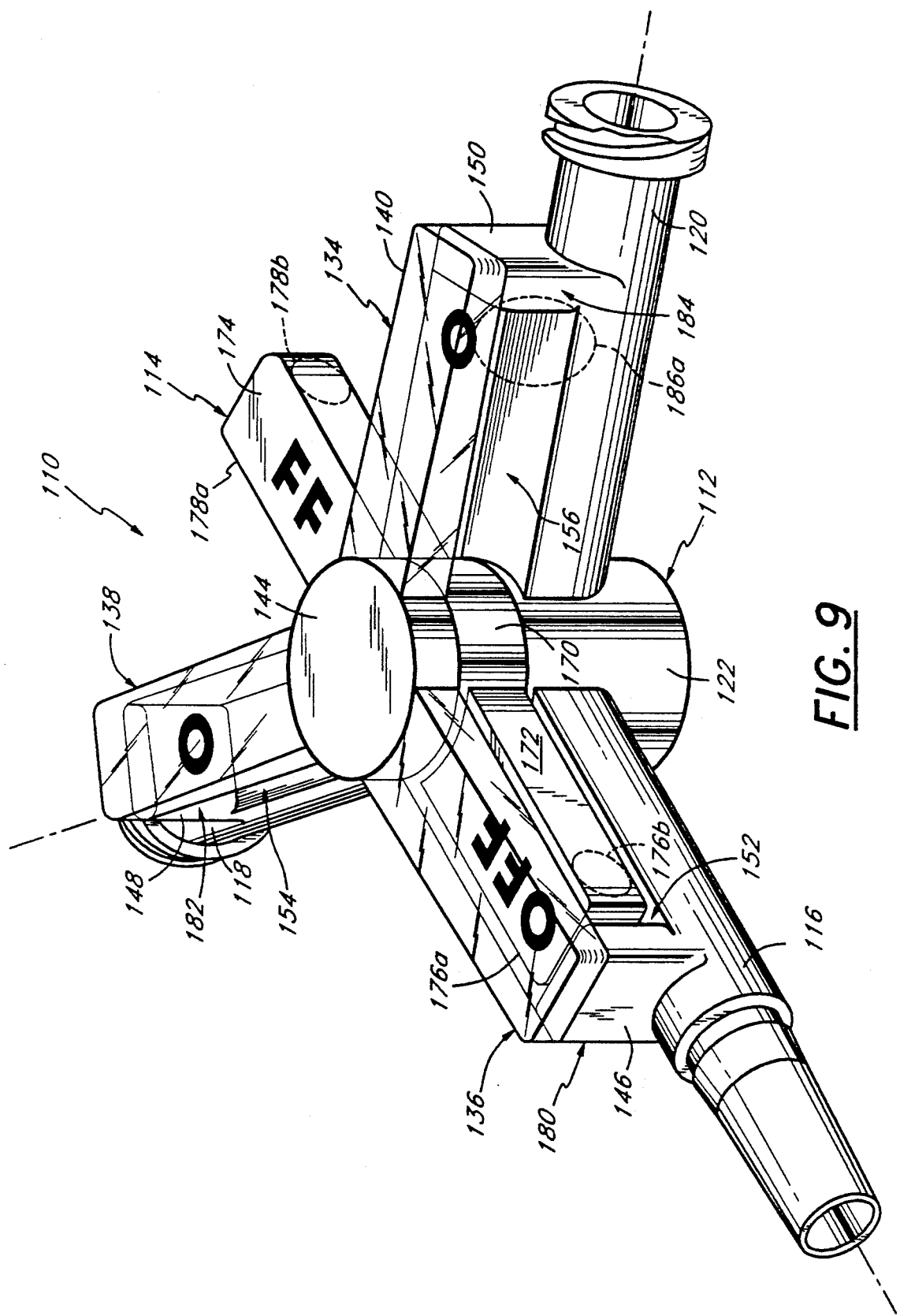
FIG. 9 is a perspective drawing of an alternative embodiment of the invention, showing indicia for determining the operable state of the valve.

Another embodiment of the present invention, which comprises a three-way stopcock 110 is shown in FIG. 9. The stopcock 110 includes a housing 112 and an actuator 114 rotatably mounted in the housing 112.

The housing 112 includes three tubular ports 116, 118, 120, angularly disposed around the circumference of a generally cylindrical main body member 122 by 120° relative to each other. These ports 116, 118, 120 permit fluid to be input to or output from the valve 110. The port 116 includes a male luer fitting, while the ports 118, 120 have female luer fittings. As with the embodiment of FIG. 1, these fittings may be used to attach the valve 110 to fluid liens, such as IV lines, connected to provide fluid flow to or from a patient. Other types of fittings may be used on any of the ports 116, 118, 120 as will be apparent to those skilled in the art.

Figure 10:
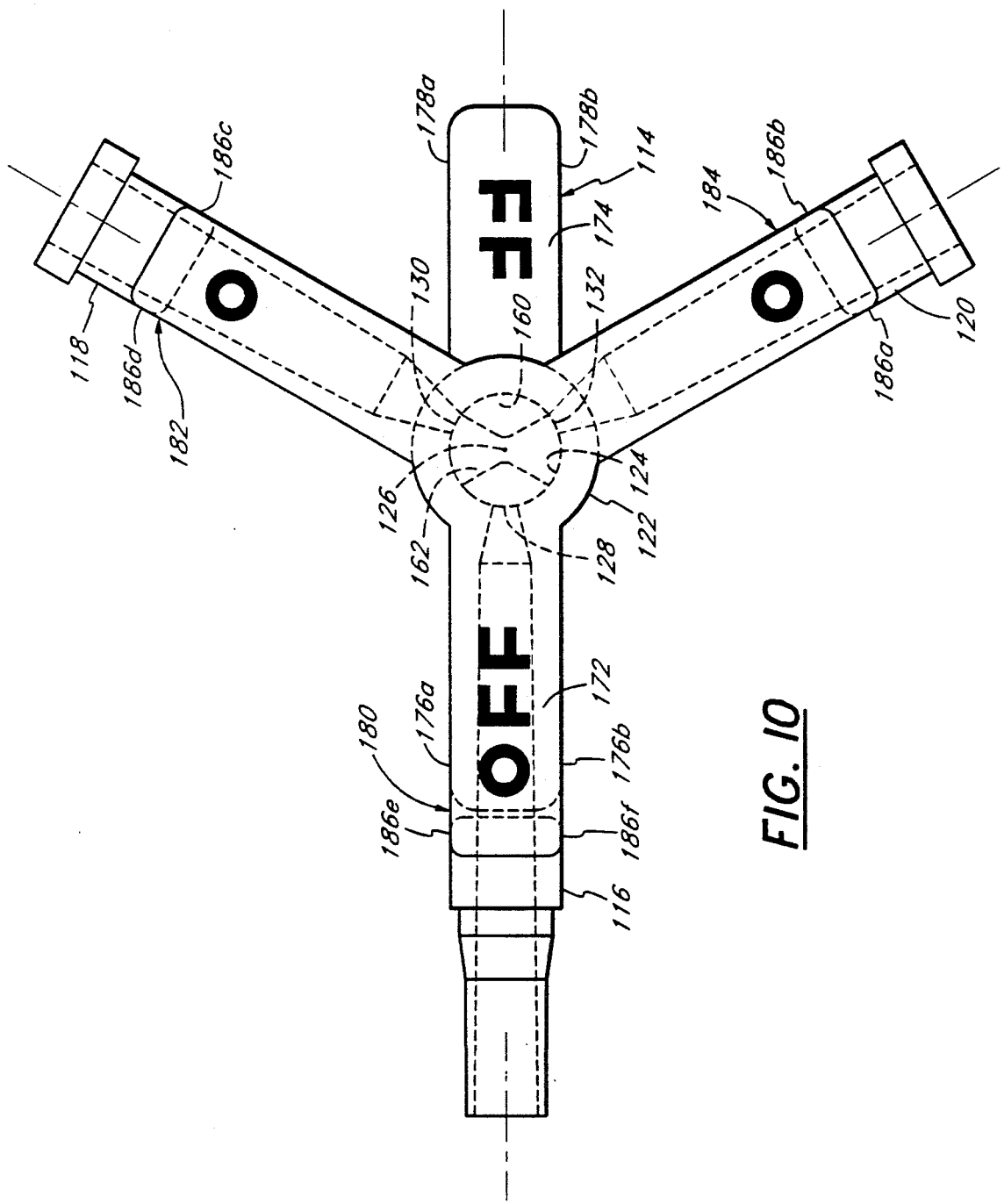
FIG. 10 is a plan view of the valve of FIG. 9, showing an hourglass shaped fluid passage oriented to fluidly connect a first pair of ports of the valve.

As shown in FIG. 10, the main body 122 includes a central bore 124 having a longitudinal axis 126. The bore 124 has a generally circular cross section and the diameter of the bore 124 is substantially uniform throughout its length. The tubular fluid ports 116, 118, 120 include openings 128, 130, 132, respectively, which open to the bore 124.

The housing 112 also includes a wing structure 134 having three wing members 136, 138, 140 which project radially from a central disk-shaped hub 144, as shown in FIG. 9. The wing members 136, 138, 140 are rigidly attached to the tubular fluid ports 116, 118, 120 by affixing them to struts 146, 148, 150, respectively. Such affixation can be accomplished, for example, by press fitting protrusions into recesses int the struts or by bonding. The struts 146, 148, 150 are disposed at the distal ends of the wing members 136, 138, 140, respectively, so as to mount the wing members 136, 138, 140 in spaced parallel relationship to the tubular fluid ports 116, 118, 120. The spacing of the wing members 136, 138, 140 relative to the tubular fluid ports 116, 118, 120, respectively, provides openings 152, 154, 156 for passage of the actuator 114.

Figure 11:
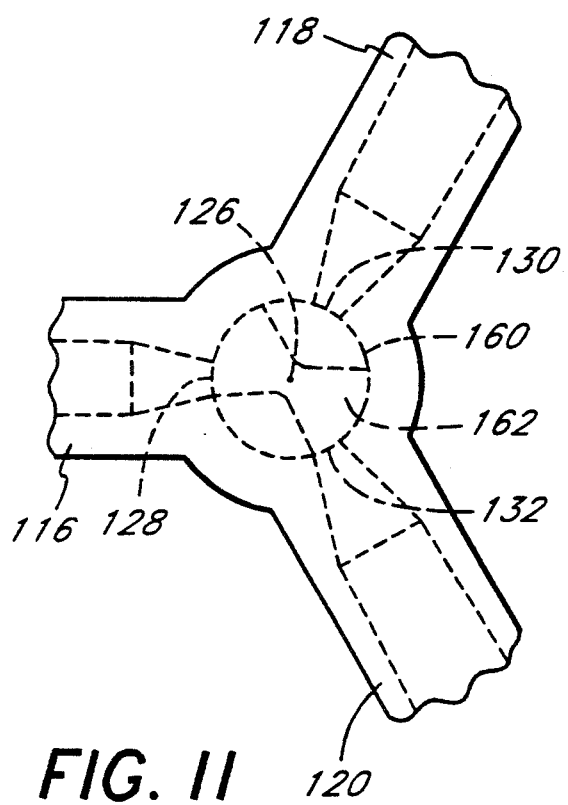
FIG. 11 is a schematic illustration of the valve of FIG. 10, showing the hourglass shaped fluid passage oriented to fluidly connect a second pair of fluid ports.

As shown in FIG. 10, the actuator 114 comprises a generally cylindrical rotatable member 160 which is rotatably mounted in the bore 124 of the housing 112. The rotatable member 160 includes an hour-glass shaped passage 162 which extends completely through the rotatable member 160 in a direction transverse to the longitudinal axis 126. The hour-glass shaped opening 162 is sized and shaped so that, by rotating the rotatable member 160, the passage 162 can be oriented to fluidly connect any two of the fluid ports 116, 118, 120 while closing off the third fluid port. For example, when the rotatable member 160 is positioned as shown in FIG. 10, the passage 162 is oriented to connect the fluid ports 118 and 120, and the fluid port 116 is closed off. When the rotatable member 160 is rotated to orient the passage 162 as shown in FIG. 11, the passage 162 fluidly connects the fluid ports 116 and 120, and the fluid port 118 is closed off. When the rotatable member 160 is rotated to orient the passage 162 to the position shown in FIG. 12, the passage 162 fluidly connects the fluid ports 116 and 118, and the fluid port 120 is closed off.

The actuator 114 also comprises an abutment member 170 as shown in FIG. 9. The abutment member comprises an annular collar integrally formed on the rotatable member 160. The abutment member 170 provides an enlarged diameter portion on the rotatable member 160 which fits between the hub 144 and main body 122 and abuts the hub 144 and main body 122. A pair of driving members 172, 174 project radially outward from the abutment portion 170 in diametrically opposed fashion. The length of the driving members is slightly less than the distance between the abutment portion 170 and the struts 146, 148, 150, so that the ends of the driving members 172, 174 will clear the struts 146, 148, 150 when the actuator 114 is rotated. These driving members 172, 174 are identical in shape and size and include side surfaces having a height which is slightly less than the distance between the fluid ports 116, 118, 120 and the wing members 136, 138, 140, respectively, so as to allow the driving members 172, 174 to pass through the openings 152, 154, 156. The width of the driving members 172, 174 is preferably approximately equal to the width of the wing members 136, 138, 140, and fluid tubes 116, 118, 120.

Due to the 120° angular displacement of the wing members 136, 138, 140 relative to the 180° diametric angular orientation of the driving members 172, 174, one of the driving members 172, 174 will be disposed between two wing members (so as to bisect the 120° angle between the wing members) when the other of the driving members 172, 174 is within one of the openings 152, 154, 156. Accordingly, in order to rotate the actuator 114 to a different position, the user simply pushes the projecting driving member into one of the openings 152, 154, 156 thereby causing the other driving member to be displaced from its position within one of the openings 152, 154, 156 to a projecting, bisecting position. The wing members, strut members, and fluid ports advantageously combine to form support members which cooperate with the driving members 172, 174 to aid in rotation of the actuator 114. For example, wing member 136, strut member 146, and fluid port 116 combine to form a first support member 180; wing member 138, strut member 148, and fluid port 118 combine to form a second support member 182; and wing member 140, strut member 150, and fluid port 120 combine to form a third support member 184. These support members 180, 182, 184 have pressure application surfaces on opposite sides thereof. For example, the support member 184 includes a pressure application surface 186a (illustrated by the dashed circle in FIG. 9) formed by a side of the wing member 140, a side of the strut member 150, and a side of the fluid tube 120. The driving members 172 and 174 similarly have pressure application surfaces 176a, 176b and 178a, 178b, respectively, which are formed by sides of driving member 172 and sides of driving member 174, respectively. The surfaces 176b, 178b are illustrated by dashed circles in FIG. 9, and the surfaces 176a, 178b are similarly situated on the other sides of the actuators 172, 174, as indicated by the reference numerals. By way of example, to rotate the actuator in a clockwise direction as viewed in FIG. 9, a user would typically place a finger or fingers on pressure application surface 178a of driving member 174 and a finger or fingers on pressure application surface 186a of the support member 184. By applying a squeezing force with the user's fingers (e.g., a thumb and forefinger), so as to drive the pressure application surfaces 178a, 186a toward one another, driving member 174 will be driven into the space 156, and, at the same time, driving member 172 will be driven out of the space 152 to a location which is midway between the fluid ports 116, 118. It will be understood that each of the support members 180, 182, 184 has two pressure application surfaces, such as described with reference to the pressure application surface 186a, to allow the user to drive the driving members 172, 174 in either direction from any position of the actuator 114. In this regard, FIG. 10 shows pressure application surfaces 186a, 186b (corresponding to member 184), pressure application surfaces 186c, 186d (corresponding toe member 182) and pressure application surfaces 1867e, 186f (corresponding to member 180).

Figure 12:
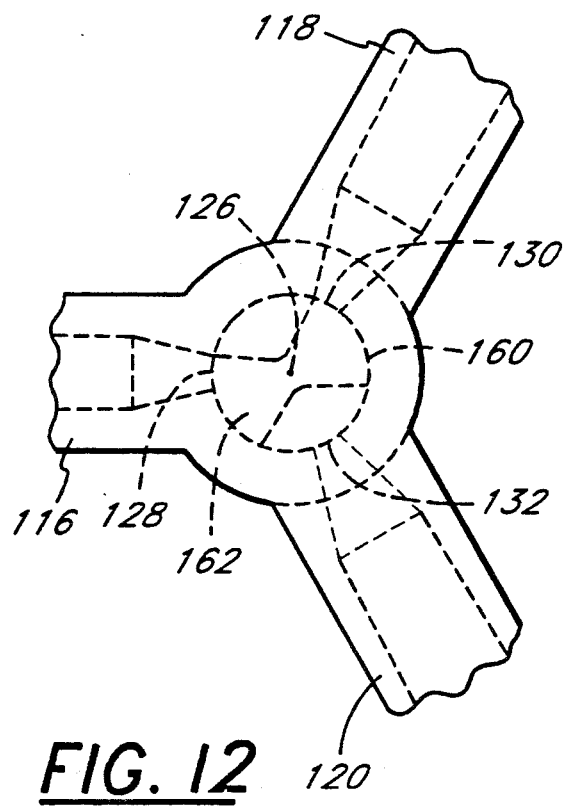
FIG. 12 is a schematic illustration of the valve of FIG. 10, showing the hourglass shaped fluid passage oriented to fluidly connect a third pair of fluid ports.

Preferably, the driving members 172, 174 are oriented relative to the fluid passage 162 of the rotatable member 160 such that the fluid passage 162 is oriented in one of the positions shown in FIGS. 10, 11, and 12, when a driving member 172, 174 is positioned within an opening 152, 154, 156. It should be noted that, due to the symmetry of the hour-glass configuration for the passage 162, the fluid connections are the same regardless of which of the driving members 172, 174 is positioned within a particular opening 152, 154, 156 corresponds to a particular fluid connection, regardless of which driving member 172 or 174 is positioned within that opening 152, 154, 156. This property of the valve can be advantageously used to provide fluid flow indicia to indicate which of the ports 116, 118, 120 is blocked and which of the ports 116, 118, 120 are in fluid communication. In the preferred embodiment, the wing members 136, 138, 140 are formed of a transparent material so that the openings 152, 154, 156 and any driving member 172, 174 therein can be viewed from the top side thereof. Each of the wing members 136, 138, 140 has the letter "O" printed on the bottom-side thereof adjacent the strut members 146, 148, 150, respectively. The driving members 172, 174 of the actuator 114 have the letters "FF" printed on the top side thereof. Each of the letters "F" is formed by two parallel horizontal lines projecting from a single vertical line. Thus, each letter "F" has a leftmost portion (i.e., the vertical line) and a rightmost portion (i.e., the two parallel, horizontal lines). The letters "F" are oriented so that the rightmost portion of each letter is closer to the rotational axis 126 (FIG. 10), than the leftmost portion. In addition, the letters are positioned so that when one of the driving members 172, 174 is positioned within one of the openings 152, 154, 156, the letter "O" on the wing member will align with the letters "FF" on the driving member to spell the word "OFF," thereby designating that the fluid port corresponding to this opening is blocked. For example, in FIG. 9, the driving member 172 is disposed within the opening 152 and the letter "O" on the wing member 136 aligns with the letters "FF" on the driving member 172 to spell the word "OFF," thereby indicating that the fluid port 116 is blocked. In this position, the openings 152, 156 do not have a driving member therein and there is no alignment of the letters "O" and "FF," thereby indicating that the fluid ports 118, 120 are open for fluid communication therebetween. Although the preferred embodiment has been depicted, it will be understood that the letters "FF" can be placed on the wing members instead of the driving members, and the letter "O" can be placed on the driving members instead of the wing members. Further, it will be apparent that the direction of the word "OFF" can be reversed from that shown in FIG. 9.

The use of a transparent material for the wing members 136, 138, 140 provides a wide range of possibilities for fluid indicia. For example, an alternative arrangement would be to provide arrows on the wing members (designating flow) and a circle with a diagonal slash therethrough (the international stop symbol) on the driving members 172, 174. When a driving member 172, 174 is within one of the spaces 152, 154, 156, the stop symbol will align with the arrow to indicate that the port corresponding thereto is blocked. Other types of indicia arrangements will be apparent to those skilled in the art.

Figure 13:
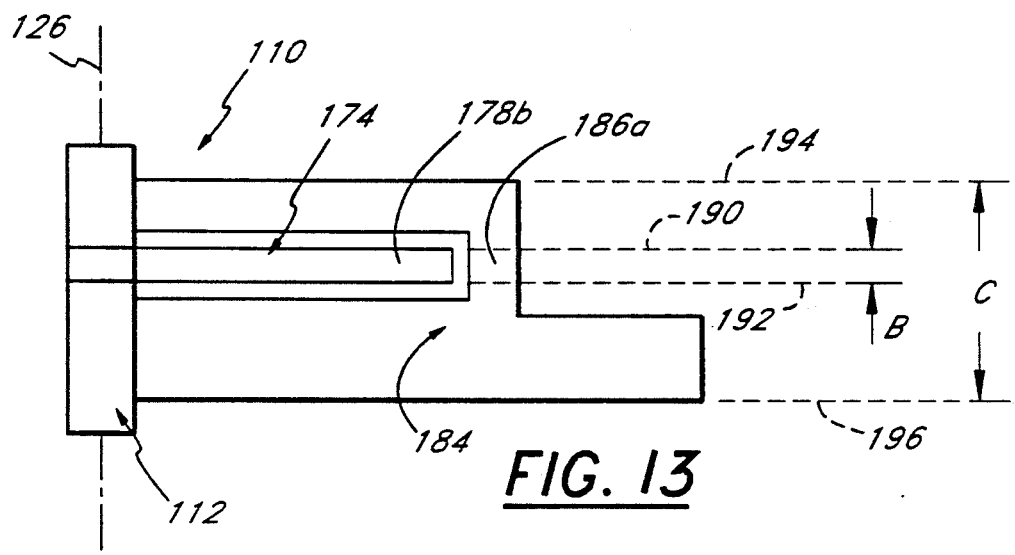
FIG. 13 is a schematic illustration of a portion of the valve of FIG. 9, illustrating the alignment of the pressure application surfaces to prevent unwanted twisting of the valve during operation.

As discussed in reference to FIGS. 1 and 2, to ensure proper one hand operation, it is preferable to align the pressure application surfaces to prevent unwanted twisting of the valve during operation. In this regard, FIG. 13 schematically illustrates the portion of the valve 110 comprising support member 184 and driving member 174. In FIG. 13, the driving member 174 has been rotated (relative to its position in FIGS. 9 and 10) by applying a squeezing force between pressure application surfaces 178a, 186a (FIG. 9), so that driving member 174 is driven into the opening 156 (FIG. 9). The members 174, 184 are positioned so that at least a portion of both pressure application surfaces 178a, 186a (FIG. 9) lie within a bounded region defined by planar boundaries 190, 192, which are perpendicular to the axis of rotation 126. The bounded region has a thickness between the planes 190, 192 (i.e., dimension B) which is equal to that of the smaller of the members 174, 184 (e.g., the driving member 174), so that both of the members 174, 184 lie at least partially within the bounded region.

As an alternative to the above arrangement, unwanted twisting or torquing may also be avoided through a more general set of conditions which is applicable to all of the embodiments described herein, including that of FIG. 1. Under this set of conditions, each driving member lies within a first region bounded by a first pair of planes 190, 192 spaced by a first distance (i.e., dimension B) such that the driving members extend from one of the planes 190, 192 to the other, while each support member lies within a second region bounded by a second pair of planes 194, 196 spaced by a second distance (i.e., dimension C) such that said support members extend from one of the planes 194, 196 to the other, as shown in FIG. 13. The first and second regions at least partially overlap n a common region such that at least a portion of the pairs of pressure application surfaces (e.g., the pair 178a, 186a) lies within the common region.

Figure 14:
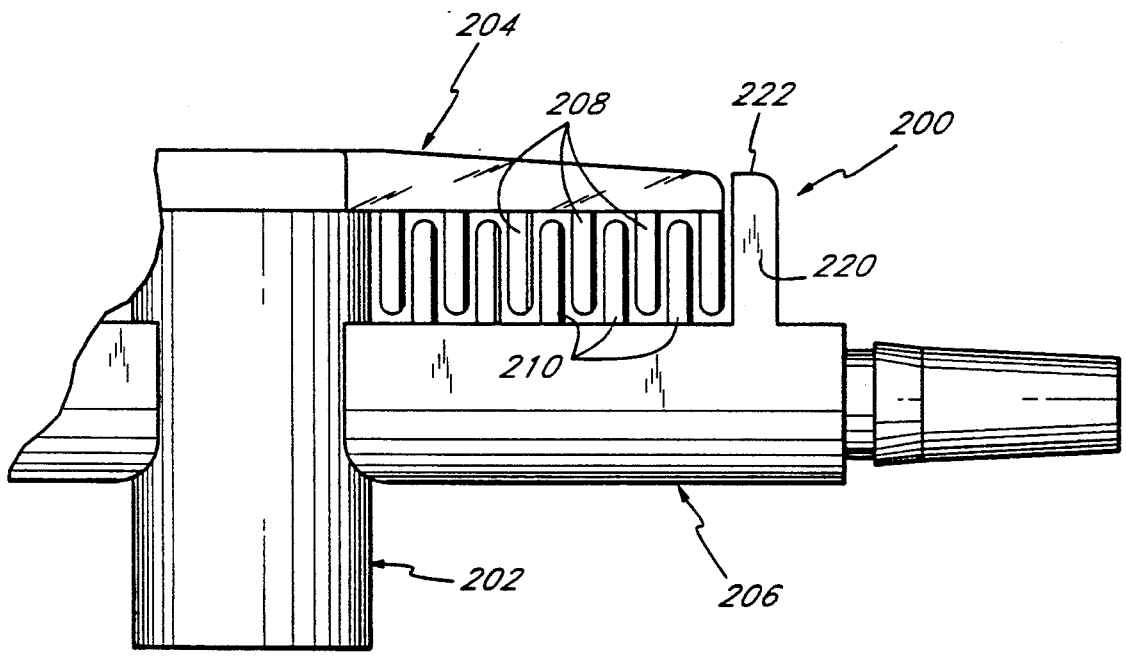
FIG. 14 is a partial elevational view of an alternative embodiment of the valve of FIG. 9.

An alternative embodiment of a three-way stopcock valve of FIG. 9 is shown in FIG. 14. As illustrated therein, a valve 200 comprises a main body 202, a driving member 204 and a support member 206. The driving member 204 functions in a manner identical to the driving members 172, 174 of FIG. 9, and the support member 206 functions in a manner identical to the support members 180 182, 184 of FIG. 9. In the embodiment of FIG. 14, the driving member 204 and support member 206 includes comb structures 208, 210, respectively, which provide opposing pressure application surfaces for applying finger pressure to rotate the driving member 204 relative to the support member 206. The comb structure 208 comprises a series of teeth which project downwardly from the driving member 204, while the comb structure 210 comprises a series of teeth which project upwardly from the support member 206. The teeth of the comb structure 208 are offset from those of the comb structure 210 to permit them to interleaf and pass through each other without interference. The teeth are sized to permit a user to push against the comb structures 208, 210 by application of finger pressure to rotate the driving member 204 relative to the support member 206 in the manner discussed in reference to FIG. 9. The system of indicia described in reference to FIG. 9 may be applied to the embodiment of FIG. 14 by including a strut 220 having an end 222 adjacent the distal end of the top of the driving member 204. The letter "O" may be applied to the strut 220 at the end 222, and the letters "FF" may be applied on the top surface of the distal end of the driving member 204 so that, when the driving member 204 is aligned with the end 222, the letters align to spell the word "OFF."

Figure 15:
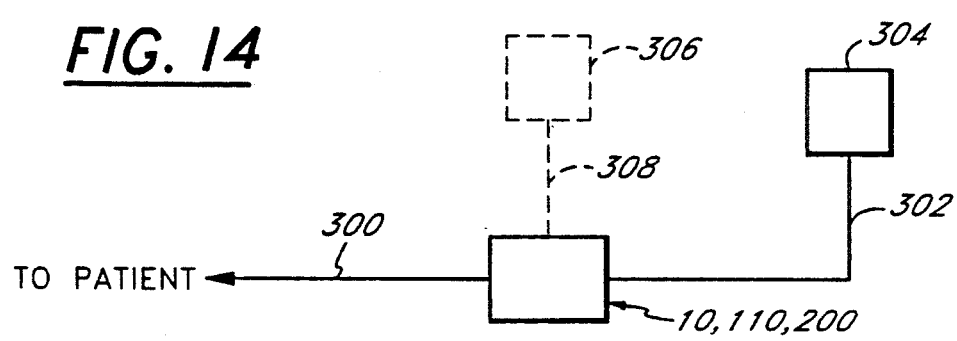
FIG. 15 is a schematic drawing illustrating a medical application of the valve of the present invention.

One application for the valve of the present invention is as a stopcock for medical use, such as controlling fluid in an IV line. As shown in FIG. 15, the valve 10, 110, 200 may be connected between IV line segments 300, 302. The line segment 302 is connected to supply of IV solution, while the line segment 300 is connected to supply the IV solution to a patient. In the event the one-way valve 10 of FIG. 1 is used, fluid flow through the line segments 300, 302 may be stopped or started by changing the operable state of the valve 10. In the event the three-way valve 110, 200 is used, an additional or alternate supply of IV solution 306 would typically be connected to the valve 110, 200 via an IV line segment 308. By changing the operable state of the valve 110, 200, fluid can be selectably supplied to the patient from either of the supplies of IV solutions 304, 306. It will be recognized that, in addition to use with patients, the valve of the present invention may also be used to control flow through various types of medical devices.

Those skilled in the art will understand that although exemplary medical uses have been described in connection with IV fluid lines, the valve of the present invention is a multi-purpose device suitable for a variety of uses. Moreover, it is to be understood that the constructions described and illustrated above in connection with the valve represent only the presently preferred embodiments of the invention, and that various modifications and additions may be made to those embodiments without departing from the scope and spirit of the present invention.

I claim:

1. A valve, comprising:
    plural fluid ports for providing at least one fluid inlet and at least one fluid outlet; and
    an actuator comprising a rotatable member having an axis of rotation, said actuator having plural positions, said actuator being rotatably responsive to a first unidirectional rotating force consisting of single-handed finger pressure when said actuator is in a first position and being rotatably non-responsive to said first force when said actuator is in a second position, said actuator rotating from said first position to said second position in response to single-handed finger pressure without application of torque about an axis perpendicular to said axis of rotation, said actuator comprising a first pressure application surface for applying finger pressure to said actuator, said first pressure application surface being disposed adjacent one of said plural fluid ports when said actuator is in said second position, and being angularly spaced from said one of said plural fluid ports by at least 45° when said actuator is in said first position, said actuator being rotatably responsive to a second unidirectional rotating force consisting of single-handed finger pressure when said actuator is in said second position and being rotatably non-responsive to said second force when said actuator is in said first position, said actuator rotating from said second position to said first position in response to single-handed finger pressure without application of torque about an axis perpendicular to said axis of rotation, said actuator comprising a second pressure application surface for applying finger pressure to said actuator, said second pressure application surface being disposed adjacent another of said plural fluid ports when said actuator is in said first position, and being angularly spaced from said another of said plural fluid ports by at least 45° when said actuator is in said second position.

2. The valve of claim 1, wherein said second pressure application surface is substantially midway between two of said plural fluid ports when said actuator is in said second position.

3. The valve of claim 2, wherein said valve comprises at least three fluid ports.

4. The valve of claim 1, wherein said first pressure application surface is spaced from said axis of rotation by a distance equal to that of said second pressure application surface.

5. The valve of claim 1, wherein said valve additionally comprises a lock member for locking said actuator in at least one of said plural positions.

6. A valve, comprising:
    plural fluid ports for providing at least one fluid inlet and at least one fluid outlet;
    an actuator comprising a rotatable member having an axis of rotation, said actuator having plural positions, said actuator being rotatably responsive to a first unidirectional rotating force when said actuator is in a first position and being rotatably non-responsive to said first force when said actuator is in a second position, said actuator being rotatably responsive to a second unidirectional rotating force consisting of squeezing pressure between two fingers of one hand when said actuator is in said second position and rotating from said second position to said first position in response to said squeezing pressure, said actuator comprising a pressure application surface which rotates within a first region bounded by a first pair of planes which are perpendicular to said axis of rotation, said first pair of planes spaced by a first distance such that said pressure application surface of said actuator extends from one of said first pair of planes to the other of said first pair of planes; and
    a member having a pressure application surface disposed within a second region bounded by a second pair of planes which are perpendicular to said axis of rotation, said second pair of planes spaced by a second distance such that said pressure application surface of said member extends from one of the second pair of planes to the other of said second pair of planes, one of said first and second regions lying within the other of said first and second regions, said pressure application surfaces being relatively positioned to rotate said actuator from said second position to said first position in response to said squeezing pressure.

7. The valve of claim 6, wherein said first and second distances are equal and said first and second planes are coincident.

8. The valve of claim 6, wherein said member comprises a fluid tube.

9. The valve of claim 8, additionally comprising a lock member for locking said actuator in one of said plural positions.

10. The valve of claim 6, wherein said pressure application surfaces are equidistant from said axis of rotation.

11. A one-hand operable valve, comprising:

a housing having at least first and second elongated tubular fluid ports, and a support structure having first and second support portions;

an actuator, comprising a rotatable member mounted in said housing, said actuator having first and second driving portions for driving said rotatable member about an axis of rotation, said first support structure and said first driving portion providing a first pair of pressure application surfaces sized for application of squeezing pressure thereon by two fingers of one hand, said second support portion and said second driving portion providing a second pair of pressure applications surfaces, sized for application of squeezing pressure thereon by two fingers of one hand, said pressure application surfaces oriented such that said rotatable member (i) rotates from a first position to a second position in response to squeezing pressure against said first pair of pressure application surfaces by two fingers of one hand, so as to place such valve in a first operational state and (ii) rotates from said second position to said first position in response to squeezing pressure against said second pair of pressure application surfaces by two fingers of one hand, so as to place said valve in a second operational state.

12. The valve of claim 11, wherein said pressure application surfaces are oriented such that said squeezing pressure of each of said pairs of said pressure application surfaces provides rotation-inducing forces which act in opposition to rotate said rotatable member without torquing said housing along an axis other than said axis of rotation.

13. The valve of claim 11, wherein said first driving portion rotates within a first region bounded by a first pair of planes which are perpendicular to said axis of rotation, said first pair of planes spaced by a first distance such that said first driving portion extends from one of said first pair of planes to the other of said first pair of planes, said first support portion lying within a second region bounded by a second pair of planes which are perpendicular to said axis of rotation, said second pair of planes spaced by a second distance such that said first support portion extends from one of the second pair of planes to the other of said second pair of planes, said first and second regions at least partially overlapping in a common region such that at least a portion of both of said first pair of pressure application surfaces lie within said common region.

14. The valve of claim 13, wherein said first and second distances are equal and said first pair of planes and said second pair of planes are coincident.

15. The valve of claim 13, wherein said first distance is smaller than said second distance.

16. The valve of claim 15, wherein said first pair of planes is between said second pair of planes.

17. The valve of claim 13, wherein said common region is no smaller than said first region.

18. The valve of claim 13, wherein said first pair of pressure application surfaces are in substantially parallel relationship and said second pair of pressure application surfaces are in non-parallel relationship when said rotatable member is in said first position, and wherein said first pair of pressure application surfaces are in non-parallel relationship and said second pair of pressure application surfaces are in substantially parallel relationship when said rotatable member is in said second position.

19. The valve of claim 11, wherein said first and second pairs of pressure application surfaces are parallel to said axis of rotation.

20. The valve of claim 11, additionally comprising a third support portion, said third support portion and one of said first and second driving portions producing a third pair of pressure application surfaces oriented such that said rotatable member rotates from one of said first and second positions to a third position in response to force against said third pair of pressure application surfaces.

21. The valve of claim 20, wherein said first, second and third support portions project radially from said axis of rotation, said support portions being angularly displaced from each other by 120°.

22. The valve of claim 20, wherein said first and second driving portions project radially from said axis of rotation, said driving portions being angularly displaced from each other by 180°.

23. The valve of claim 20, wherein said valve includes three fluid ports, said rotatable member having a passage configured to selectively fluidly connect any one of said first, second and third pairs of said fluid ports upon rotation of said rotatable member to said first, second and third positions, respectively.

24. The valve of claim 11, wherein said support portions and driving portions project radially from said axis of rotation, said support portions being angularly displaced from each other by 180° and said driving portions being angularly displaced from each other by 135°.

25. The valve of claim 11, wherein said rotatable member has a passage configured to fluidly connect said first and second ports when said rotatable member is in said first position and fluidly disconnect said first and second ports when said rotatable member is in said second position.

26. The valve of claim 11, wherein said support portions and said driving portions are generally planar.

27. The valve of claim 11, wherein said support portions include openings for receiving said driving portions therein.

28. The valve of claim 11, wherein said support portions and said driving portions comprises comb structures.

29. The valve of claim 11, additionally comprising a locking member for selectably locking said rotatable member in one of said first and second positions.

30. The valve of claim 29, wherein said locking member is slaved to rotate with said rotatable member.

31. The valve of claim 30, wherein said locking member has first and second positions, one of which prevents rotation of said rotatable member relative to said housing and the other of which permits rotation of said rotatable member relative to said housing.

32. The valve of claim 31, wherein said locking member comprises a pin having first splines at one end thereof, said housing including second splines for mating with said first and second splines to be engaged when said locking member is in said first position and to permit said first and second splines to disengage when said locking member is in said second position.

33. The valve of claim 11, additionally comprising first indicia on said housing and second indicia on said actuator, said indicia positioned to align when said rotatable member is in said first position and to misalign when said rotatable member is in said second position.

34. The valve of claim 33, wherein said first indicia comprises one letter of a word and the second indicia comprises another letter of said word.

35. The valve of claim 33, wherein the first indicia comprises a pair of lien segments and the second indicia comprises a line segment.

36. The valve of claim 11, additionally comprising at least first and second luer fittings for connecting said ports to IV lines and the like.

37. The valve of claim 11, additionally comprising means for selectably locking said rotatable member in one of said states.

38. The valve of claim 11, additionally comprising a locking mechanism which has two positions, one of which locks said actuator to said housing to prevent relative movement therebetween, and the other of which unlocks said actuator and said housing to permit relative movement therebetween.

39. The valve of claim 38, wherein said locking mechanism comprises a pin mounted in a base of said actuator, said pin being slaved to rotatably move with said actuator, but slidable along said base, said pin and said housing having mating members which engage and disengage in response to the sliding.

40. The valve of claim 39, wherein at least one of said mating members comprises splines.

41. A method of operating a stopcock valve having a member which rotates about an axis of rotation to control fluid flow through IV lines and the like, the method comprising (i) flowing fluid through a passageway in said rotatable member, and (ii) switching operational states of said valve which correspond to a fully open position and a fully closed position, by squeezing portions of said valve between two fingers of one hand such that torque is applied to rotate said member about said axis of rotation without application of torque about an axis other than said axis of rotation.

42. The method of claim 41, wherein said fingers comprise a thumb and forefinger.

43. A valve, comprising:
at least first and second tubular ports for providing at least one fluid inlet and one fluid outlet; and
a rotatable member having an axis of rotation, said rotatable member having plural positions corresponding to plural operational states, said positions comprising at least first and second positions, said rotatable member being rotatably responsive to a first unidirectional rotating force consisting of a first squeezing pressure between two fingers of one hand when said member is in said first position and being rotatably nonresponsive to said first squeezing pressure when said member is in said second position, said member being rotatably responsive to a second unidirectional rotating force consisting of a second squeezing pressure between two fingers of one hand when said member is in said second position and rotating from said second position to another of said plural positions in response to said second single-handed finger pressure without application of torque about an axis other than said axis of rotation.

44. The valve of claim 43, wherein said valve includes a third port, and wherein said plural positions include a third position corresponding to a third operational state.

45. The valve of claim 43, wherein said member is rotatable in both a clockwise direction and a counterclockwise direction.

46. The valve of claim 43, additionally comprising a locking member configured to lock said rotatable member in one of said positions.

* * * * *